US012682034B2

(12) United States Patent
Genner et al.

(10) Patent No.: US 12,682,034 B2
(45) Date of Patent: Jul. 14, 2026

(54) MULTI-FACTOR AUTHENTICATION USING TAMPER-RESISTANT BAND AND BIOMETRIC DATA

(71) Applicant: T STAMP INC., Atlanta, GA (US)

(72) Inventors: Gareth Neville Genner, Atlanta, GA (US); David Michael Grima, Atlanta, GA (US)

(73) Assignee: T Stamp Inc., Atlanta, GA (US)

( * ) Notice: Subject to any disclaimer, the term of this patent is extended or adjusted under 35 U.S.C. 154(b) by 39 days.

(21) Appl. No.: 18/828,671

(22) Filed: Sep. 9, 2024

(65) Prior Publication Data

US 2025/0086261 A1 Mar. 13, 2025

Related U.S. Application Data

(63) Continuation of application No. PCT/US2024/045801, filed on Sep. 9, 2024.

(60) Provisional application No. 63/581,409, filed on Sep. 8, 2023.

(51) Int. Cl.
*G06F 21/32* (2013.01)

(52) U.S. Cl.
CPC .................................... *G06F 21/32* (2013.01)

(58) Field of Classification Search
CPC ...................................................... G06F 21/32
See application file for complete search history.

(56) References Cited

U.S. PATENT DOCUMENTS

| 10,019,769 | B1 * | 7/2018 | Hodge .................... G06Q 50/26 |
| 2010/0267361 | A1 * | 10/2010 | Sullivan .................. G01S 19/17 |
| | | | 455/404.2 |
| 2020/0019682 | A1 * | 1/2020 | Lee ...................... H04L 63/0853 |

* cited by examiner

*Primary Examiner* — Thaddeus J Plecha
(74) *Attorney, Agent, or Firm* — Bradley Arant Boult Cummings LLP; Daniel E. Sineway, Esq.

(57) ABSTRACT

User identity authentication and verification systems, methods, and apparatuses are disclosed, including a mobile computing device configured to receive a verification request from a remote computing system, the verification request including instructions for a user to perform a task for verifying his identity. A task includes scanning a band securely attached to the user's body, the band including an embedded communication device and a tamper indication circuit. In response to performing the scan, the mobile computing device receives, from the embedded communication device, a circuit tamper status and uniquely identifying data encoded within the communication device. The mobile computing device transmits its geographic location data and the received circuit tamper status and uniquely identifying data to the remote computing system for subsequent processing, where an untampered circuit tamper status and verified uniquely identifying data confirms a presence of the user at the mobile computing device's location.

21 Claims, 4 Drawing Sheets

MULTI-FACTOR AUTHENTICATION USING TAMPER-RESISTANT BAND AND BIOMETRIC DATA

CROSS REFERENCE TO RELATED APPLICATIONS

This application is a continuation patent application of, and claims the benefit of and priority to, International Patent Application No. PCT/US2024/045801, filed on Sep. 9, 2024, and entitled "MULTI-FACTOR AUTHENTICATION USING TAMPER-RESISTANT BAND AND BIOMETRIC DATA," which claims the benefit of and priority to U.S. Provisional Patent Application No. 63/581,409, filed on Sep. 8, 2023, and entitled "MULTI-FACTOR AUTHENTICA- TION USING TAMPER-PROOF BAND AND BIOMET- RIC DATA," the disclosure of which are incorporated by reference in their entireties as if the same were fully set forth herein.

TECHNICAL FIELD

The present systems, methods, and apparatuses relate generally to identity authentication and, more particularly to multi-factor authentication using tamper-resistant bands.

BACKGROUND

Alternative to detention (ATD) systems are increasingly becoming a popular mechanism, for example, in law enforcement, immigration, and custody scenarios, for con- ducting personnel identification as well as tracking and monitoring compliance with personnel release conditions. Conventional ATD systems require personnel, or subjects, to "check in" with a monitoring party, at the monitoring party's request, via various means. For example, conventional ATD systems can use global positioning system (GPS) technol- ogy in a subject's smartphone, smartwatch, or a similar device, to track his/her location, and a subject is typically required to confirm his/her location by interacting with prompts on his/her device (which are typically generated and sent by a monitoring party). However, these conven- tional systems are susceptible to compliance failures, such as subjects spoofing or otherwise falsely representing their identities, for example, by easily allowing others to check-in on behalf of the intended subjects by sharing devices, swapping devices, etc. These shortcomings undermine the effectiveness and usefulness of ATD systems. Therefore, there is a long-felt but unmet need for multi-factor authen- tication using a tamper-resistant band.

BRIEF SUMMARY

Briefly described, and according to one embodiment, aspects of the present disclosure generally relate to systems and methods for multi-factor authentication using a tamper- resistant band.

Aspects of the present disclosure relate to an alternative to detention (ATD) system which can include a mobile com- puting device, a monitoring system, and a tamper-resistant band (or bracelet) assigned to and worn by a human subject. As will be described in greater detail herein, in response to receiving, from the monitoring party, a prompt on his/her mobile computing device to verify his/her geographic loca- tion (a "check-in" request), the subject can be instructed to scan or tap his/her tamper-resistant band to the mobile computing device (or the user can perform another appropriate check-in action). In response to tapping his/her tam- per-resistant band to the mobile computing device, informa- tion encoded onto a communication device within the band (also referred to herein as band data) is received from, retrieved from, detected from, or otherwise obtained from the tamper-resistant band via the mobile computing device. The mobile computing device can, in turn, transmit the band data (and other additional data such as a mobile computing device geographic location data, biometric data, etc.) to the monitoring party. According to various aspects of the present disclosure, the tamper-resistant band is configured to be generally unremovable from a human subject, unless forc- ibly removed, once secured to the user's body. Moreover, via specific electronic circuitry embedded within the band, the system is configured to identify and record instances in which a subject removes, alters, or tampers with his/her band, and data corresponding to these tamper events can be included in the band data. The monitoring party can process the received band data, and the mobile computing device geographic location data, for determining whether the received band data and geographic location corresponds to the correct subject for which the check-in request was intended. In one example, the mobile computing device can process the received band data prior to transmitting the band data to the monitoring party.

The communication device embedded within the tamper- resistant band can include a tamper status (for example, representing "tampered" or "untampered" states), which can be scanned or read from the band by the subject's mobile computing device. The tamper state can indicate whether the band was removed, cut, compromised, or materially altered, after being assigned to the subject. The tamper-resistant bands discussed herein are specifically configured such that the bands are not easily removable after being secured to a subject's body. Moreover, removing the tamper-resistant bands can disrupt an electrical circuit connected to the embedded communication device within the tamper-resis- tant bands, where the electrical circuit state (for example, an open or closed state) corresponds to the tamper status.

The disclosed systems, methods, and apparatuses are generally used in settings and scenarios in which one or more subjects' whereabouts are tracked. Furthermore, the disclosed systems, methods, and apparatuses are generally used in settings and scenarios in which it is desirable to monitor one or more subjects, their geolocations, their general movements, etc. For example. the disclosed systems, methods, and apparatuses can be used in settings and sce- narios such as law enforcement settings, parole settings, immigration settings, or the like. In these settings and scenarios, a user's whereabouts are generally tracked and monitored by performing verification tasks (such as a "check-in" request) using the user's mobile computing device and the user's assigned tamper-resistant band. How- ever, the system can also be configured such that a single mobile computing device can be used for "checking-in" a plurality of users. For example, a family which includes a plurality of members can use a single familial mobile computing device (such as a parental or guardian device) for "checking-in" the plurality of family members. In this example, each family member can be assigned his/her own tamper-resistant band to wear, and each tamper-resistant band can be registered to the single familial mobile com- puting device. In response to receiving a verification request at the single familial mobile computing device, each family member can tap his/her tamper-resistant band to the familial mobile computing device to verify his/her location, each family member can use the familial mobile computing device to provide biometric data for identity authentication and verification, etc. In this way, a plurality of users can be tracked and monitored using only a single mobile computing device. This familial mobile computing device scenario can be particularly useful in immigration scenarios in which a plurality of family members is to be tracked and monitored; however, each family member may not own his/her own mobile computing device.

For example, a subject can be a parolee that was recently released from a detection center and is now enrolled in an ATD program. Under the ATD program, the subject can be assigned a tamper-resistant band, and the tamper-resistant band can be securely attached to the body of the parolee. In general, once secured to the body of the parolee, the tamper-resistant band is effectively unremovable from the subject's body unless the band is forcibly destroyed (e.g., cut, ripped, broken, etc.). Further, as a condition to the ATD program, the subject can be required to comply with numerous daily check-ins with his/her parole officer to verify that the parolee is at a permitted location, to verify that the parolee is continuing to wear his/her tamper-resistant band, etc. In this example, the parole officer can generate verification requests for the parolee, and the parole officer can cause the verification requests to be transmitted to the parolee's mobile computing device via a monitoring party computing system. In response to the parolee using his/her mobile computing device to scan his/her tamper-resistant band, and thereby receiving the band data encoded thereon, the band data in combination with geolocation data from the mobile computing device can be processed (by the mobile computing device and/or the monitoring party computing system) to authenticate the subject's identity and generally verify the subject's location. The mobile computing device and/or the monitoring party can process the band data to determine the tamper status, and whether the tamper status represents a tampered or untampered state. If the band data includes a tamper status indicative of a tampered state, the mobile computing device and/or the monitoring party computing system can indicate the verification request as being failed (or otherwise unable to verify the parolee's identity). However, if the parolee generally complies with the verification request such that he/she performs timely scans of his/her tamper-resistant band, the band's tamper status indicates an untampered state, and the mobile computing device's geographic location at the time of the scan corresponds to a permitted location, the verification request can be considered satisfied. In conventional systems and parole scenarios, the parolee would have been required to visit the parole office and/or wear a bulky ankle monitor, which are not only inconvenient but also stigmatizing; however, the system, methods, and apparatuses as disclosed herein solve these problems.

In examples or scenarios in which subjects, such as the parolee discussed above, may not own a mobile computing device, his/her mobile computing is out of battery, lost, stolen, broken, etc., subjects can use generally any mobile computing device to scan his/her tamper-resistant band. In these scenarios, subjects can use any appropriate device to scan his/her tamper-resistant band without receiving a notification or prompt for doing so (e.g., the parolee is to scan his/her band every hour, at predetermined times, or according to another appropriate schedule). The mobile computing device, and other appropriate devices, can include an operative connection to a power source (e.g., wired power, battery power, etc.), near field communication (NFC) capabilities (such as transmitting, writing, encoding, receiving, reading, and scanning capabilities), radio frequency identification (RFID) capabilities, wireless network connectivity (for example, via LTE, 4G, 5G, Wi-Fi, Bluetooth, etc.), etc.

The system disclosed herein can be configured such that in response to a mobile computing device scanning a tamper-resistant band, the mobile computing device can receive instructions from the communication device within the tamper-resistant band to establish a web-based connection to a specific URL or web address, through which subjects or users can submit proof of his/her identity for satisfying verification requests (e.g., check-ins). In these scenarios, proof of identity can include biometric data such as facial scans, contactless palm, voice recognition, eye or iris scans, fingerprint data, etc. In this way, the system can perform multimodal identity authentication, and processing biometric data in combination with band data can enhance system security and fidelity by preventing spoofing and ensuring check-in authenticity.

The system can furthermore be configured to store encrypted biometric data (and other encrypted information) on the tamper-resistant bands, and the encrypted biometric data can be included in the scanned band data. For example, tokenized representations of a subject's biometric data can be encoded in an encrypted format into memory within the band's communication device. Other encrypted information can be encoded into memory within a band's communication device, such as (but not limited to band tamper status, a band tap or read count, a universally unique identifier (UUID), a globally unique identifier (GUID), etc., which can enable secure communications between a subject's mobile computing device and a monitoring party's computing system. Accordingly, the system disclosed herein is configured to handle subject data in accordance with data privacy and information security standards across various jurisdictions, while also providing reliable and robust subject monitoring and verification capabilities to monitoring parties.

According to a first aspect, or any other aspect discussed herein, the present disclosure includes a method including: receiving, at a mobile computing device, a verification request from a remote computing system, wherein the verification request includes instructions for a user to perform one or more verification tasks, and wherein a particular verification task of the one or more verification tasks includes the user scanning a band securely attached to a body of the user; displaying, via a screen on the mobile computing device, an indication of the verification request and corresponding instructions for the user to perform the particular verification task, wherein the particular verification task includes scanning the band with the mobile computing device; receiving, from a communication device embedded within the band, band data including uniquely identifying information and a band tamper status; determining a geographic location of the mobile computing device in response to receiving the band data; and transmitting, from the mobile computing device to a remote computing system, a data package including the band data and the geographic location of the mobile computing device for subsequent processing at the remote computing system, wherein an untampered band tamper status and verified uniquely identifying information confirms a presence of the user at the geographic location.

According to a second aspect, or any other aspect discussed herein, the method, wherein the uniquely identifying information includes tokenized biometric data corresponding to the user.

According to a third aspect, or any other aspect discussed herein, the method, further including: displaying, via the screen on the mobile computing device, the verification request and corresponding instructions for the user to perform a subsequent verification task including providing one or more biometric features from the body of the user; and receiving, via one or more sensors of the mobile computing device, the one or more biometric features from the body of the user.

According to a fourth aspect, or any other aspect discussed herein, the method, wherein the data package transmitted from the mobile computing device to the remote computing system includes the one or more biometric features from the body of the user.

According to a fifth aspect, or any other aspect discussed herein, the method, wherein subsequent verification processing of the uniquely identifying information includes comparing the one or more biometric features from the body of the user and the tokenized biometric data to determine a match.

According to a sixth aspect, or any other aspect discussed herein, the method, wherein the data package further includes a timestamp generated by the mobile computing device in response to receiving the band data.

According to a seventh aspect, or any other aspect discussed herein, the method, wherein the subsequent processing in response to transmitting the data packet to the remote computing system includes comparing the timestamp, generated by the mobile computing device in response to receiving the band data, to a prior timestamp, generated by the remote computing system in connection with the verification request, to determine a verification request compliance rate.

According to an eighth aspect, or any other aspect discussed herein, the present disclosure describes a system including: a processor; and a memory on which are stored machine-readable instructions that when executed by the processor, cause the processor to: receive, at a mobile computing device, a verification request from a remote computing system, wherein the verification request includes instructions for a user to perform one or more verification tasks, and wherein a particular verification task of the one or more verification tasks includes the user scanning a band securely attached to a body of the user; display, via a screen on the mobile computing device, an indication of the verification request and corresponding instructions for the user to perform the particular verification task, wherein the particular verification task includes scanning the band with the mobile computing device; receive, from a communication device embedded within the band, band data including uniquely identifying information and a band tamper status; determine a geographic location of the mobile computing device in response to receiving the band data; and transmit, from the mobile computing device to a remote computing system, a data package including the band data and the geographic location of the mobile computing device for subsequent processing at the remote computing system, wherein an untampered band tamper status and verified uniquely identifying information confirms a presence of the user at the geographic location.

According to a ninth aspect, or any other aspect discussed herein, the system, wherein the uniquely identifying information includes tokenized biometric data corresponding to the user.

According to a tenth aspect, or any other aspect discussed herein, the system, wherein the processor is further caused to: display, via the screen on the mobile computing device, the verification request and corresponding instructions for the user to perform a subsequent verification task including providing one or more biometric features from the body of the user; and receive via one or more sensors of the mobile computing device, the one or more biometric features from the body of the user.

According to an eleventh aspect, or any other aspect discussed herein, the system, wherein the data package transmitted from the mobile computing device to the remote computing system includes the one or more biometric features from the body of the user.

According to a twelfth aspect, or any other aspect discussed herein, the system, wherein subsequent verification processing of the uniquely identifying information includes comparing the one or more biometric features from the body of the user and the tokenized biometric data to determine a match.

According to a thirteenth aspect, or any other aspect discussed herein, the system, wherein the data package further includes a timestamp generated by the mobile computing device in response to receiving the band data.

According to a fourteenth aspect, or any other aspect discussed herein, the system, wherein the subsequent processing in response to transmitting the data packet to the remote computing system includes comparing the timestamp, generated by the mobile computing device in response to receiving the band data, to a prior timestamp, generated by the remote computing system in connection with the verification request, to determine a verification request compliance rate.

According to a fifteenth aspect, or any other aspect discussed herein, the present disclosure describes a non-transitory computer readable medium including instructions that, when read by a processor, cause the processor to perform: receiving, at a mobile computing device, a verification request from a remote computing system, wherein the verification request includes instructions for a user to perform one or more verification tasks, and wherein a particular verification task of the one or more verification tasks includes the user scanning a band securely attached to a body of the user; displaying, via a screen on the mobile computing device, an indication of the verification request and corresponding instructions for the user to perform the particular verification task, wherein the particular verification task includes scanning the band with the mobile computing device; receiving, from a communication device embedded within the band, band data including uniquely identifying information and a band tamper status; determining a geographic location of the mobile computing device in response to receiving the band data; and transmitting, from the mobile computing device to a remote computing system, a data package including the band data and the geographic location of the mobile computing device for subsequent processing at the remote computing system, wherein an untampered band tamper status and verified uniquely identifying information confirms a presence of the user at the geographic location.

According to a sixteenth aspect, or any other aspect discussed herein, the non-transitory computer readable medium, wherein the uniquely identifying information includes tokenized biometric data corresponding to the user.

According to a seventeenth aspect, or any other aspect discussed herein, the non-transitory computer readable medium, further including instructions that, when read by a processor, further cause the processor to perform: displaying, via the screen on the mobile computing device, the verification request and corresponding instructions for the user to perform a subsequent verification task including providing one or more biometric features from the body of the user; and receiving, via one or more sensors of the mobile computing device, the one or more biometric features from the body of the user.

According to an eighteenth aspect, or any other aspect discussed herein, the non-transitory computer readable medium, wherein the data package transmitted from the mobile computing device to the remote computing system includes the one or more biometric features from the body of the user.

According to a nineteenth aspect, or any other aspect discussed herein, the non-transitory computer readable medium, wherein subsequent verification processing of the uniquely identifying information includes comparing the one or more biometric features from the body of the user and the tokenized biometric data to determine a match.

According to a twentieth aspect, or any other aspect discussed herein, the non-transitory computer readable medium, wherein the data package further includes a timestamp generated by the mobile computing device in response to receiving the band data, and wherein the subsequent processing in response to transmitting the data packet to the remote computing system includes comparing the timestamp, generated by the mobile computing device in response to receiving the band data, to a prior timestamp, generated by the remote computing system in connection with the verification request, to determine a verification request compliance rate.

According to a twenty-first aspect, or any other aspect discussed herein, the present disclosure describes a system including: a mobile computing device; and a wearable band, wherein the wearable band includes: a locking mechanism, wherein the locking mechanism is operatively configured to secure the wearable band to a body of a subject; and a communication device embedded within the wearable band, wherein the communication device includes a tamper circuit operatively configured to indicate a binary tamper status corresponding to the subject's continuous wearing of the wearable band subsequent to securing the wearable band to the body of the subject via the locking mechanism, and wherein in response to the communication device deriving power from an electromagnetic field generated by the mobile computing device, the communication device is operatively configured to: transmit, to the mobile computing device, a request for a particular version number corresponding to an encryption key, wherein the encryption key is configured to permit access to a memory of the communication device, and wherein the memory includes identifying information corresponding to the subject; receive, from the mobile computing device, the encryption key corresponding to the particular version number; and transmit, to the mobile computing device, the binary tamper status and identifying information corresponding to the subject.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
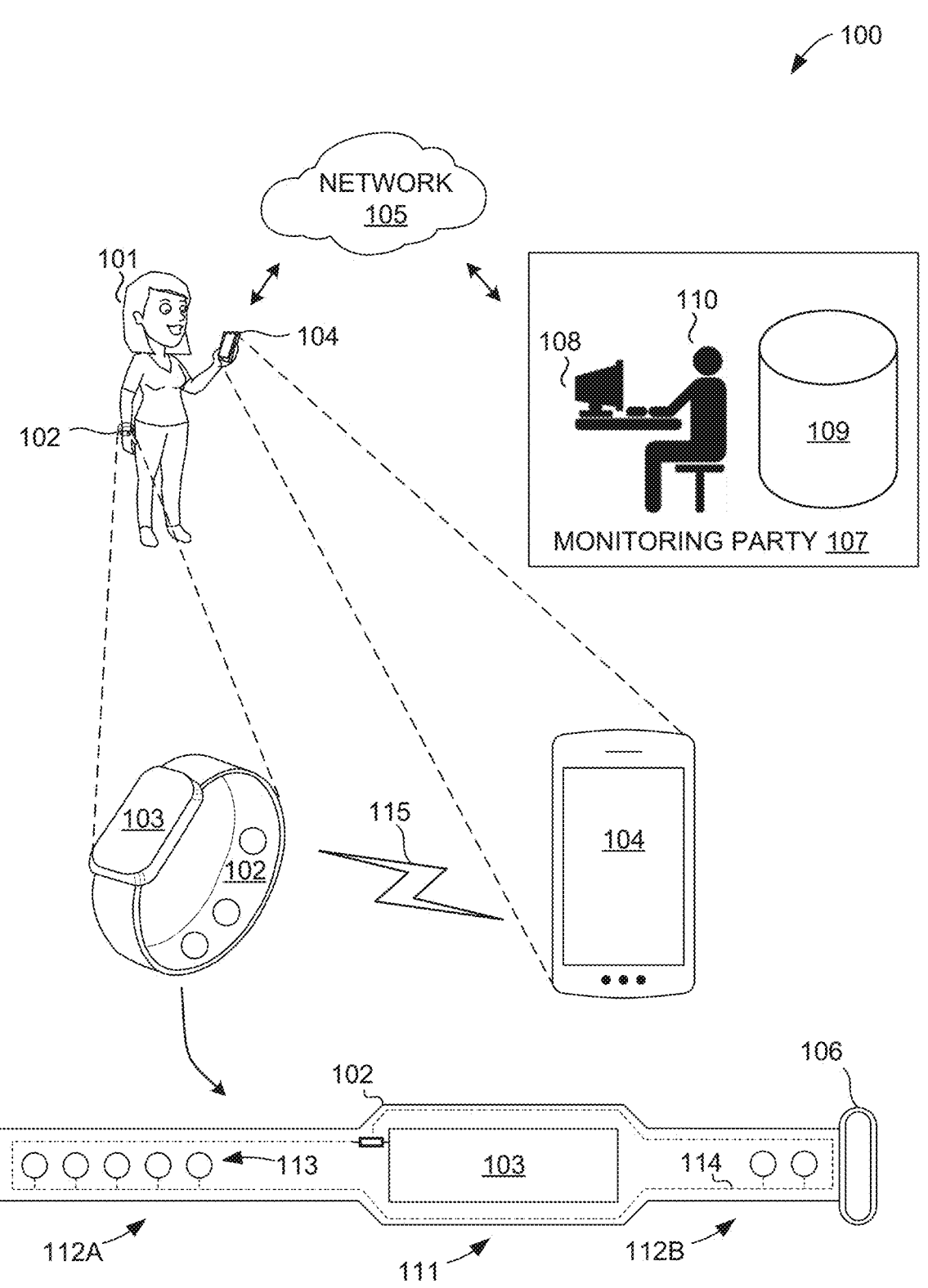
FIG. 1 illustrates an example system operational environment, in accordance with the disclosed technology.

The disclosed technology generally relates to systems, methods, and apparatuses for identity authentication, and more specifically to multi-factor authentication using a tamper-resistant band and biometric data. Some examples of the disclosed technology will be described more fully with reference to the accompanying drawings. However, this disclosed technology may be embodied in many different forms and should not be construed as limited to the implementations set forth herein. The components described hereinafter as making up various elements of the disclosed technology are intended to be illustrative and not restrictive. Indeed, it is to be understood that other examples are contemplated. Many suitable components that would perform the same or similar functions as components described herein are intended to be embraced within the scope of the disclosed electronic devices and methods. Such other components not described herein may include, but are not limited to, for example, components developed after development of the disclosed technology.

Throughout this disclosure, various aspects of the disclosed technology can be presented in a range of formats (e.g., a range of values). It should be understood that such descriptions are merely for convenience and brevity and should not be construed as an inflexible limitation on the scope of the disclosed technology. Accordingly, the description of a range should be considered to have specifically disclosed all the possible subranges as well as individual rational numerical values within that range. For example, a range described as being "from 1 to 6" or "from approximately 1 to approximately 6" includes the values 1, 6, and all values therebetween. Likewise, a range described as being "between 1 and 6" or "between approximately 1 and approximately 6" includes the values 1, 6, and all values therebetween. The same premise applies to any other language describing a range of values. That is to say, the ranges disclosed herein are inclusive of the respective endpoints, unless otherwise indicated.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

In the following description, numerous specific details are set forth. But it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicates that different instances of like objects are being referred to and are not intended to imply that the objects so described should be in a given sequence, either temporally, spatially, in ranking, or in any other manner.

Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

For the purpose of promoting an understanding of the principles of the present disclosure, reference will now be made to the illustrative examples provided in the drawings, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims. All limitations of scope should be determined in accordance with and as expressed in the claims.

Overview

Briefly described, and according to one embodiment, aspects of the present disclosure generally relate to systems and methods for multi-factor authentication using a tamper-resistant band.

Aspects of the present disclosure relate to an alternative to detention (ATD) system which can include a mobile computing device, a monitoring system, and a tamper-resistant band (or bracelet) assigned to and worn by a human subject. As will be described in greater detail herein, in response to receiving, from the monitoring party, a prompt on his/her mobile computing device to verify his/her geographic location (a "check-in" request), the subject can be instructed to scan or tap his/her tamper-resistant band to the mobile computing device (or the user can perform another appropriate check-in action). In response to tapping his/her tamper-resistant band to the mobile computing device, information encoded onto a communication device within the band (also referred to herein as band data) is received from, retrieved from, detected from, or otherwise obtained from the tamper-resistant band via the mobile computing device. The mobile computing device can, in turn, transmit the band data (and other additional data such as a mobile computing device geographic location data, biometric data, etc.) to the monitoring party. According to various aspects of the present disclosure, the tamper-resistant band is configured to be generally unremovable from a human subject, unless forcibly removed, once secured to the user's body. Moreover, via specific electronic circuitry embedded within the band, the system is configured to identify and record instances in which a subject removes, alters, or tampers with his/her band, and data corresponding to these tamper events can be included in the band data. The monitoring party can process the received band data, and the mobile computing device geographic location data, for determining whether the received band data and geographic location corresponds to the correct subject for which the check-in request was intended. In one example, the mobile computing device can process the received band data prior to transmitting the band data to the monitoring party.

The communication device embedded within the tamper-resistant band can include a tamper status (for example, representing "tampered" or "untampered" states), which can be scanned or read from the band by the subject's mobile computing device. The tamper state can indicate whether the band was removed, cut, compromised, or materially altered, after being assigned to the subject. The tamper-resistant bands discussed herein are specifically configured such that the bands are not easily removable after being secured to a subject's body. Moreover, removing the tamper-resistant bands can disrupt an electrical circuit connected to the embedded communication device within the tamper-resistant bands, where the electrical circuit state (for example, an open or closed state) corresponds to the tamper status.

The disclosed systems, methods, and apparatuses are generally used in settings and scenarios in which one or more subjects' whereabouts are tracked. Furthermore, the disclosed systems, methods, and apparatuses are generally used in settings and scenarios in which it is desirable to monitor one or more subjects, their geolocations, their general movements, etc. For example. the disclosed systems, methods, and apparatuses can be used in settings and scenarios such as law enforcement settings, parole settings, immigration settings, or the like. In these settings and scenarios, a user's whereabouts are generally tracked and monitored by performing verification tasks (such as a "check-in" request) using the user's mobile computing device and the user's assigned tamper-resistant band. However, the system can also be configured such that a single mobile computing device can be used for "checking-in" a plurality of users. For example, a family which includes a plurality of members can use a single familial mobile computing device (such as a parental or guardian device) for "checking-in" the plurality of family members. In this example, each family member can be assigned his/her own tamper-resistant band to wear, and each tamper-resistant band can be registered to the single familial mobile computing device. In response to receiving a verification request at the single familial mobile computing device, each family member can tap his/her tamper-resistant band to the familial mobile computing device to verify his/her location, each family member can use the familial mobile computing device to provide biometric data for identity authentication and verification, etc. In this way, a plurality of users can be tracked and monitored using only a single mobile computing device. This familial mobile computing device scenario can be particularly useful in immigration scenarios in which a plurality of family members is to be tracked and monitored; however, each family member may not own his/her own mobile computing device.

For example, a subject can be a parolee that was recently released from a detection center and is now enrolled in an ATD program. Under the ATD program, the subject can be assigned a tamper-resistant band, and the tamper-resistant band can be securely attached to the body of the parolee. In general, once secured to the body of the parolee, the tamper-resistant band is effectively unremovable from the subject's body unless the band is forcibly destroyed (e.g., cut, ripped, broken, etc.). Further, as a condition to the ATD program, the subject can be required to comply with numerous daily check-ins with his/her parole officer to verify that the parolee is at a permitted location, to verify that the parolee is continuing to wear his/her tamper-resistant band, etc. In this example, the parole officer can generate verification requests for the parolee, and the parole officer can cause the verification requests to be transmitted to the parolee's mobile computing device via a monitoring party computing system. In response to the parolee using his/her mobile computing device to scan his/her tamper-resistant band, and thereby receiving the band data encoded thereon, the band data in combination with geolocation data from the mobile computing device can be processed (by the mobile computing device and/or the monitoring party computing system) to authenticate the subject's identity and generally verify the subject's location. The mobile computing device and/or the monitoring party can process the band data to determine the tamper status, and whether the tamper status represents a tampered or untampered state. If the band data includes a tamper status indicative of a tampered state, the mobile computing device and/or the monitoring party computing system can indicate the verification request as being failed (or otherwise unable to verify the parolee's identity). However, if the parolee generally complies with the verification request such that he/she performs timely scans of his/her tamper-resistant band, the band's tamper status indicates an untampered state, and the mobile computing device's geographic location at the time of the scan corresponds to a permitted location, the verification request can be considered satisfied. In conventional systems and parole scenarios, the parolee would have been required to visit the parole office and/or wear a bulky ankle monitor, which are not only inconvenient but also stigmatizing; however, the system, methods, and apparatuses as disclosed herein solve these problems.

In examples or scenarios in which subjects, such as the parolee discussed above, may not own a mobile computing device, his/her mobile computing is out of battery, lost, stolen, broken, etc., subjects can use generally any mobile computing device to scan his/her tamper-resistant band. In these scenarios, subjects can use any appropriate device to scan his/her tamper-resistant band without receiving a notification or prompt for doing so (e.g., the parolee is to scan his/her band every hour, at predetermined times, or according to another appropriate schedule). The mobile computing device, and other appropriate devices, can include an operative connection to a power source (e.g., wired power, battery power, etc.), near field communication (NFC) capabilities (such as transmitting, writing, encoding, receiving, reading, and scanning capabilities), radio frequency identification (RFID) capabilities, wireless network connectivity (for example, via LTE, 4G, 5G, Wi-Fi, Bluetooth, etc.), etc.

The system disclosed herein can be configured such that in response to a mobile computing device scanning a tamper-resistant band, the mobile computing device can receive instructions from the communication device within the tamper-resistant band to establish a web-based connection to a specific URL or web address, through which subjects or users can submit proof of his/her identity for satisfying verification requests (e.g., check-ins). In these scenarios, proof of identity can include biometric data such as facial scans, contactless palm, voice recognition, eye or iris scans, fingerprint data, etc. In this way, the system can perform multimodal identity authentication, and processing biometric data in combination with band data can enhance system security and fidelity by preventing spoofing and ensuring check-in authenticity.

The system can furthermore be configured to store encrypted biometric data (and other encrypted information) on the tamper-resistant bands, and the encrypted biometric data can be included in the scanned band data. For example, tokenized representations of a subject's biometric data can be encoded in an encrypted format into memory within the band's communication device. Other encrypted information can be encoded into memory within a band's communication device, such as (but not limited to band tamper status, a band tap or read count, a universally unique identifier (UUID), a globally unique identifier (GUID), etc., which can enable secure communications between a subject's mobile computing device and a monitoring party's computing system. Accordingly, the system disclosed herein is configured to handle subject data in accordance with data privacy and information security standards across various jurisdictions, while also providing reliable and robust subject monitoring and verification capabilities to monitoring parties.

Example Embodiments

Referring now to the figures, for the purposes of example and explanation of the fundamental processes and components of the disclosed systems and methods, reference is made to FIG. 1, which illustrates an example system environment 100 of an embodiment of the present disclosure. As will be understood and appreciated, the example system environment 100 shown in FIG. 1 represents merely one approach or embodiment of the present system, and other aspects are used according to various embodiments of the present system.

As shown in FIG. 1, the system environment 100 can include a user 101 wearing a wrist band, ankle band, bracelet, or the like. In one example, the wrist band can be a tamper-resistant band 102. As will be discussed in greater detail herein, the tamper-resistant band 102 can be a band that is secured to the body of the user 101 (for example, around a wrist, ankle, etc.) and is generally unremovable unless forcibly tampered with (e.g., cut, ripped, pulled, etc.). Moreover, the tamper-resistant band 102 can include specific electronic circuitry such that any tampering to the band 102 can be electronically recognized, stored, and as discussed herein, communicated to other devices.

The tamper-resistant band 102 can generally be any type of band or bracelet that can be configured as securable or unremovable from the user 101. In one example, the tamper-resistant band 102 can be specifically constructed of a hypoallergenic, durable material (such as silicon or rubber-like material) that is safe and comfortable for humans to wear. For example, the tamper-resistant band 102 can resemble a fitness band or smart watch, and the band's specific electronic circuitry and communication devices can be embedded within the band during manufacturing. The tamper-resistant band 102 can be unobtrusive, so as not to draw unnecessary or unwanted attention from others towards the user 101. Further, the band 102 can be configured such that its performance is unaffected by factors such as skin color, tattoos, prosthetics, etc.

Further illustrated in the system environment 100 is a mobile computing device 104 and a communication device 103, where the communication device 103 can be embedded within (or generally integrated with) the tamper-resistant band 102. The mobile computing device 104 can be a smartphone, tablet, a smart watch, or a similar device. The mobile computing device 104 can be operatively connected to a monitoring party 107 via a network 105. In certain examples, the network 105 can be a wired network or a wireless network, such as a cellular network, a local network, etc. As will be discussed in greater detail herein, the network 105 allows for data packages and other electronic communications to be transmitted and received between the user's mobile computing device 104 and computing devices associated with the monitoring party 107. For example, the monitoring party 107 can include a remote computing system 108, a database 109, and any other appropriate computing equipment. The remote computing system 108 can be one or more desktop computers, laptop computers, tablets, smartphones, etc., configured with a processor, memory, a display screen, etc. The remote computing system 108 can also include one or more computer servers and/or cloud processing equipment and/or cloud processing integrations. The database 109 can be an on-premises (local) local and/or off-premises (remote) database. In one example, the database 109 can be a SQL database, a NoSQL database, or generally any appropriate type of database. As shown in the system environment 100, the monitoring party 107 can be operated, monitored, configured, etc., by one or more agents 110. Via the remote computing system 108, the one or more agents 110 can access a graphical user interface, portal, platform, or the like, for managing and monitoring users to which the tamper-resistant bands 102 are assigned. For example, the one or more agents 110 can be parole officers, immigration officers, parents, caretakers, etc.

Shown towards the bottom of the system environment 100 is an example internal view of an unworn tamper-resistant band 102. The tamper-resistant band 102 can be specifically designed and configured to include the communication device 103 embedded within the tamper-resistant band 102, or otherwise generally integrated with the tamper-resistant band 102. The tamper-resistant band 102 can include a tapered design such that a center portion 111 includes a greater thickness and/or width than the straps 112A-B extending from either end of the center portion 111. In one example, the center portion can include a width within the range of 20 mm-25 mm, and the straps 112A-B can include a width in the range of 14 mm-19 mm. The tamper-resistant band 102 can include a total length of about 240 mm-270 mm.

The tamper-resistant band 102 can include a plurality of eyelets 113 (or holes) on the band straps 112A-B, as well as a locking mechanism 106, or a locking buckle, for securing the tamper-resistant band 102 to a user's body. The strap 112A can be threaded through the locking mechanism 106, and the locking mechanism 106 can include a rivet, pin, tongue, or the like, that can be positioned through an eyelet 113 of the plurality of eyelets 113 and received by the locking mechanism 106 for securing the rivet. In response to positioning a locking mechanism rivet through the eyelet 113, the locking mechanism 106 can be securely closed thereby preventing the strap 112A from being removed or adjusted. As will be discussed in greater detail herein, the locking mechanism 106 can be configured such that it is a one-time or single use locking mechanism 106. The locking mechanism 106 can be configured such that it can be unlocked with a physical key. The locking mechanism 106 can be unlocked with a digital key in examples where the locking mechanism 106 includes electronics for receiving wireless/wired communications.

Still referring to the example internal view of an unworn tamper-resistant band 102 shown towards the bottom of the system environment 100, the communication device 103 embedded within the tamper-resistant band 102 can include a tamper loop 114. The tamper loop 114 can be a thin conductive wire, material, or the like, which can form a closed-loop circuit with the communication device 103. The tamper loop 114 can also be an open-loop circuit which can be completed, or closed, by securing the locking mechanism 106 onto the strap 112A-B, where the tamper loop 114 continues around each of the plurality of eyelets 113. The communication device 103 can be configured to detect, via reading a signal present on an input/output pin within the communication device 103, whether the tamper loop 114 remains a closed-loop circuit, or if the circuit has otherwise been disturbed. For example, a resistance measured above 1 MOhm can correspond to an open, or tampered, circuit, while a resistance measured below 50 Ohm can correspond to a closed, or untampered circuit.

In one example, the communication device 103 can be a near field communication (NFC) tag, or another similar NFC device. In particular examples, the communication device 103 can be a NXP NTAG 424 DNA TT tag, manufactured by NXP Semiconductors, or a similar device. Accordingly, the communication device 103 can be a passive device, such that the communication device 103 does not include a battery or another power source. As will by understood by one of ordinary skill in the art, NFC tags and similar devices can generate power in response to detecting electromagnetic fields generated by other nearby devices and converting the same into energy to execute or perform one or more functions encoded onto the tags. For example, in response to physically touching a smartphone to an NFC tag, or in response to placing the smartphone within 1 cm, 2 cm, 3 cm, 4 cm, 5 cm, 10 cm, etc., of the NFC tag, the NFC tag can derive power (via electromagnetic induction) from energy produced by, and generally emanating from, the smartphone. In this way, the communication device 103 can derive its own power from other devices, such as the mobile computing device 104.

As will be discussed in greater detail herein, in response to deriving power from the mobile computing device 104, the communication device 103 can establish a wireless connection 115 with the device 104. The wireless connection 115 can be a 13.56 MHz connection in accordance with the ISO/IEC 18000-3 standard. Furthermore, the wireless connection 115 can be an encrypted connection, such that the information transmitted between the tamper-resistant band 102 and the mobile computing device 104 is encrypted according to the AES-128 encryption standard (or any other appropriate encryption standard). The encrypted connection can allow for mutual authentication between the communication device 103 and the mobile computing device 104. Through this established wireless connection 115, the communication device 103 can transmit, to the mobile computing device 104, information that is encoded onto the communication device 103. The communication device 103 can transmit information via an antenna and/or a modulation circuit included within the communication device 103. For example, the communication device 103 can include a flexible printed circuit (FPC) antenna, or the like, which can be configured to transmit and/or receive signals and/or data from the mobile computing device 104 and other mobile devices.

The communication device 103 can include a memory with information encoded thereon, and in response to deriving power from the mobile computing device 104, the communication device 103 can read the information from the memory and transmit the information across the established wireless connection 115. This information, referred to throughout the present disclosure as band data, can include (but is not limited to) information such as a band tamper status, a band Universally Unique Identifier (UUID), a Globally Unique Identifier (GUID), a band tap or read count, security key versions (if applicable), a uniform resource locator (URL), encrypted and/or tokenized personally identifiable data such as name, address, social security number, healthcare data such as allergies, blood type, prescribed medications, etc. The band data can furthermore include biometric data, such as a tokenized biometric representation, or another appropriate user biometric. In one example, user 101 biometric data can be encoded onto the communication device 103, and the user biometric data can be included in band data transmissions for use as a parameter in the user authentication and verification processing as discussed throughout the present disclosure. The user 101 can provide biometric data to the monitoring party 107, for example, in the form of facial scans, pictures of the user 101, fingerprints, palms, eye scans, iris scans, voice recordings, etc., and the monitoring party 107 can in turn process the user's biometric data (via features extraction algorithms, neural networks, etc.) and encode the user's biometric data (or a tokenized representation of the biometric data, such as an IT2 token) onto a tamper-resistant band 102 that is specifically assigned to the user 101. In certain examples, the biometric data processing and tokenization can be performed by the user's mobile computing device 104, such that the user 101 need not share his/her sensitive biometric data with the monitoring party 107. However, the monitoring party 107 can store (within the database 109) encrypted biometric data and/or tokenized biometric representations corresponding to the system users or subjects, and the monitoring party 107 can use the stored biometric data for authenticating a user's identity in connection with a user verification request.

The mobile computing device 104 and the computing system 108 can perform biometric data processing, biometric data tokenization, biometric authentication, etc., in accordance with the systems and methods as described in the following patent applications:

U.S. Non-Provisional patent application Ser. No. 17/966, 355, now U.S. Pat. No. 11,681,787, filed on Oct. 14, 2022, and entitled "OWNERSHIP VALIDATION FOR

16

CRYPTOGRAPHIC ASSET CONTRACTS USING IRREVERSIBLY TRANSFORMED IDENTITY TOKENS;"

U.S. Non-Provisional patent application Ser. No. 17/401, 504, now U.S. Pat. No. 11,972,637, filed on Aug. 13, 2021, and entitled "SYSTEMS AND METHODS FOR LIVENESS-VERIFIED, BIOMETRIC-BASED ENCRYPTION;"

U.S. Non-Provisional patent application Ser. No. 15/955, 270, now U.S. Pat. No. 11,095,631, filed on Apr. 17, 2018, and entitled "SYSTEMS AND METHOD FOR IDENTITY VERIFICATION VIA THIRD PARTY ACCOUNTS;"

U.S. Non-Provisional patent application Ser. No. 16/841, 269, now U.S. Pat. No. 11,301,586, filed on Apr. 6, 2020, and entitled "SYSTEMS AND PROCESSES FOR LOSSY BIOMETRIC REPRESENTATIONS;"

U.S. Non-Provisional patent application Ser. No. 16/406, 978, now U.S. Pat. No. 11,496,315, filed May 8, 2019, and entitled "SYSTEMS AND METHODS FOR ENHANCED HASH TRANSFORMATIONS;"

U.S. Non-Provisional patent application Ser. No. 17/230, 684, filed on Apr. 14, 2021, and entitled "SYSTEMS AND PROCESSES FOR MULTIMODAL BIOMETRICS;"

U.S. Non-Provisional patent application Ser. No. 18/145, 470, filed on Dec. 22, 2022, and entitled "SYSTEMS AND PROCESSES FOR MULTIFACTOR AUTHENTICATION AND IDENTIFICATION;"

U.S. Non-Provisional patent application Ser. No. 17/725, 978, filed on Apr. 21, 2022, and entitled "INTEROPERABLE BIOMETRIC REPRESENTATION;"

U.S. Non-Provisional patent application Ser. No. 17/719, 975, filed on Apr. 13, 2022, and entitled "PERSONALLY IDENTIFIABLE INFORMATION ENCODER; "and U.S. Non-Provisional patent application Ser. No. 17/745, 270, filed on May 16, 2022, and entitled "SECURE REPRESENTATIONS OF AUTHENTICITY AND PROCESSES FOR USING SAME," the entire contents of which are incorporated by reference as if fully set forth herein.

The communication device 103 memory can be encrypted according to AES-128 encryption standards, or other encryption standards. Moreover, the communication device 103 can be configured to perform Secure Unique NFC Message (SUN) operations, such that the communication device 103 can generate unique metadata in connection with each communication session established between the communication device 103 and the mobile computing device 104 over the wireless connection 115. The communication device 103 can include a file-based memory structure, which can furthermore include a Capability Container (CC) file, an NFC Data Exchange Format (NDEF) file, and one or more additional files in which sensitive data can be securely stored. The communication device 103 memory can include a data retention time duration of about 50 years, and the memory can include a minimum write endurance of about 200,000 cycles. The CC file can include information relating to NFC forum tag operations, band data access keys or key versions, band data read/write permissions, file identification numbers (IDs) etc. In one example, access rights to the communication device 103, and the one or more files encoded thereon, can be individually configurable (on a per-file basis), which allows for specific band data elements to be transmitted based on the mobile device initiating the communication session and/or based on a source of a verification request.

As discussed herein, the communication device 103 can be a passive device (such that it does not have its own power source), and therefore the communication device 103 is generally not configured to transmit band data without first receiving a power from another device. Accordingly, if a user wearing a tamper-resistant band 102 removes the band 102 from his/her body, which as a result breaks the tamper loop 114, this change in state or status of the tamper loop 114 is generally not recognized or recorded until the band 102 receives power from another device (such as the mobile computing device 102) and detects the change in status. In one example, the change in status is detected by reading a file (such as the CC file or an NDEF file), a specific register, address, or location in the communication device memory. The communication device 103 can determine that a tamper loop 114 is broken, or otherwise tampered with, based on a resistance measured at a pin within the communication device 103, where the pin is operatively connected to the tamper loop 114. A resistance measured above 1 MOhm can correspond to an open, or tampered, circuit, while a resistance measured below 50 Ohm can correspond to a closed, or untampered circuit. Detecting an open circuit can result in the communication device 103 registering, or encoding, a "0" tamper status in the memory, while detecting a closed circuit can result in the tamper status remaining as an initially encoded "1" (corresponding to an untampered status). In some examples, communication device can represent the tamper status as being "invalid" if the tamper status functionality is disabled or not yet configured. In response to receiving power from another device, the communication device 103 can transmit the "tampered," "untampered," or "invalid" tamper status as hexadecimal representations of "O," "C," and "I," respectively.

As will be discussed in greater detail below, a monitoring party 107 can request that the user 101 comply with ATD system conditions by periodically, according to a predetermined schedule, or upon request, "checking-in" with the monitoring party 107. Accordingly, and in response to the user 101 tapping his/her mobile computing device 104 onto his/her tamper-resistant band 102, the tamper-resistant band 102 derives power from the mobile computing device 104, and the tamper-resistant band 102 transmits band data to the mobile computing device 104 over the wireless connection 115. The mobile computing device 104 can, in turn, be configured to transit the band data and/or additional data such as geographic location data, to the monitoring party 107. In this way, the monitoring party 107 can determine if the user 101 is still wearing an untampered band 102 and if the user 101 is in a geographic location that is generally permitted under the ATD system conditions. The system can be configured to request, capture, and/or process user biometric data in connection with a verification request for further authenticating the user 101, and thus verifying the user's compliance under the ATD system conditions.

Figure 2:
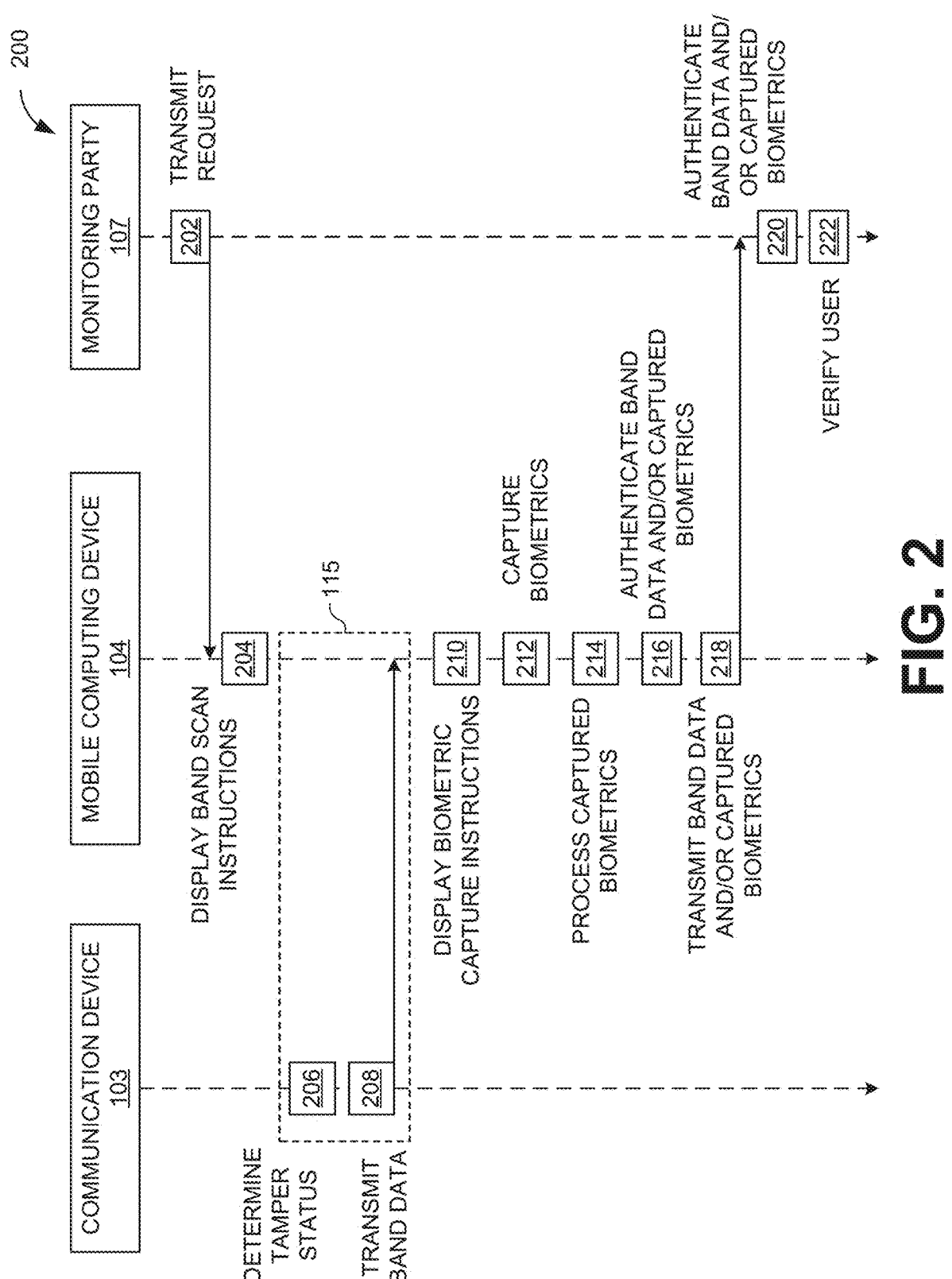
FIG. 2 is a sequence diagram of an example user authentication and verification process, in accordance with the disclosed technology.

FIG. 2 is a sequence diagram of a user authentication and verification process 200, in accordance with the disclosed technology. As will be understood by one having ordinary skill in the art, the steps and processes shown in FIG. 2 (and those of all other flowcharts and sequence diagrams shown and described herein) may operate concurrently and continuously, are generally asynchronous and independent, and are not necessarily performed in the order shown. In general, the sequence diagram 200 illustrates the communications that can occur between the monitoring party 107, the mobile computing device 104, and the communication device 103, as well as the processing steps that can occur at each of those system components, with respect to time. For example, the sequence diagram shown in FIG. 2 generally illustrates the end-to-end process of a monitoring party 107 requesting for a user to verify his/her location and/or identity using his/her mobile computing device 104 and his/her assigned tamper-resistant band 102.

The verification process 200 can begin at step 202, where the monitoring party 107 generates and transmits verification request corresponding to one or more users. Verification requests can be generated on-demand, such that the requests can be generated according to the discretion of a monitoring party agent 110. However, the verification requests can also be generated according to a predetermined schedule, frequency, etc. In certain examples, verification requests can be transmitted to a user's mobile computing device automatically and without intervention from a monitoring party agent 110.

While the present disclosure primarily discusses examples where a verification request corresponds to an individual user, a verification request can also correspond to a plurality of users that are associated with a single device. In this example, a family including multiple members can be associated with a single mobile computing device, and each family member can be assigned his/her own tamper-resistant band 102 to securely wear on his/her body. In this example, each family member can scan his/her tamper-resistant band 102 to the single mobile computing device for responding to the verification request.

A user's mobile computing device 104 can be registered with the monitoring party 107, such that the monitoring party 107 can include information corresponding to the mobile computing device (such as a telephone number, device identification number, etc.) which can be used for determining to where the verification request is to be transmitted. However, and as will be discussed in greater detail herein, a user 101 can download a mobile application on his/her mobile computing device 104, where the mobile application corresponds to, is managed, operated, or otherwise controlled by, the monitoring party 107. The user can create an account through the mobile application, which in turn is stored within the database 109 of the monitoring party 107, and the computing system 108 at the monitoring party 107 can initiate verification requests with (or transmit requests to) the user 101 via APIs or the like through the mobile application integration.

At step 204, the mobile computing device can display an indication of the verification request (for example, a pop-up notification) and the mobile computing device can furthermore display specific instruction for completing the verification request. For example, the verification request can include instructions for the user 101 to scan his/her tamper-resistant band 102 with his/her mobile computing device 104.

In response to the user 101 scanning his/her tamper-resistant band 102, the communication device 103 embedded therein can become activated. As shown in FIG. 2 by the dashed box surrounding step 206 and step 208, which is representative of the wireless connection 115 as discussed above in connection with the description of FIG. 1, the user 101 scanning his/her band 102 with his/her mobile computing device 104 can result in wireless power/energy generation and data transfer capabilities via near field communication technology. In one example, for the duration of the processing steps 206 and 208, the mobile computing device 104 can be physically touching, or in close physical proximity to, the communication device 103. In response to the communication device 103 generating sufficient power to being performing its configured operations, the communication device can perform the step 206.

At step 206, the communication device 103 determines its tamper status. Determining the tamper status can include measuring an electrical resistance on a circuit referred to herein as a tamper loop 114. In response to receiving power, a resistance corresponding to the tamper loop 114 can be measured by an input/output pin operatively connected to the circuit. Based on the measured resistance, the tamper status is encoded within the communication device 103 memory as a binary representation, where "0" corresponds to a broken or tampered circuit, and a "1" corresponds to an untampered circuit.

At step 208, the communication device transmits band data to the mobile communication device 104. In one example, the band data can include uniquely identifying information and the tamper status. The band data can also include a band Universally Unique Identifier (UUID), a Globally Unique Identifier (GUID), a band tap or read count, security key versions (if applicable), a uniform resource locator (URL), encrypted personally identifiable data such as name, address, social security number, healthcare data such as allergies, blood type, prescribed medications, etc. The band data can furthermore include biometric data, such as a tokenized biometric representation, or another appropriate user biometric. As will be discussed in more detail in connection with the description of FIG. 3, the specific band data elements included in the transmission can be configurable (within the communication device 103) based on, for example, the mobile device from which the activation signal is received and/or based on a source corresponding to a verification request.

At step 210, the mobile computing device 104 can display one or more instructions for capturing biometrics from the user 101. For example, the mobile computing device 104 can prompt the user 101 to scan his/her face using a camera or similar sensor on the mobile computing device 104. The mobile computing device 104 can prompt the user 101 to provide any available and appropriate biometric, such as a fingerprint scan, contactless palm scan, eye scan, iris scan, voice recording etc. The prompt for capturing user biometric data can be a predetermined prompt included in the initial verification request in connection with step 202. However, the mobile computing device 104, via the registered mobile application thereon, can determine that user biometrics should be captured for satisfying the verification request. In some examples, a user's mobile computing device 104 periodically requests to capture biometric data from the user 101 for maintaining a privileged status with the monitoring party 107 (such that flexible compliance requirements are granted for maintaining and providing current and authenticated biometrics).

At step 212, the mobile computing device 104 can capture biometrics from the user 101, as discussed above and in accordance with the disclosure herein. The mobile computing device 104 can process the captured biometrics at step 214. The mobile computing device 104 can process the captured biometrics via one or more feature extraction and biometric tokenization algorithms. Processing the captured biometrics can include generating a tokenized representation of the user's biometric data, such as an IT2 token.

At step 216, the mobile computing device 104 can authenticate the band data and/or the captured biometric data. In one example, the band data can include biometric data previously provided by the user and encoded onto the tamper-resistant band 102. Accordingly, the biometric data from the band data can be compared to the captured and processed biometric band data (from steps 212 and 214) for authenticating the user 101 (for example, based on a match between the biometric data from the band and the captured biometric data). The mobile computing device 104 authenticating the band data at step 216 can also include comparing band data elements such as a UUID and/or other uniquely identifying data elements to corresponding data elements stored on the mobile computing device 104 (or included in the verification request as transmitted at step 202). The mobile computing device 104 can include a tokenized representation of the user's biometric data stored thereon (for example, an enrolled tokenized biometric stored during registration/initialization, or a previously scanned and tokenized biometric). Accordingly, in response to the mobile computing device 104 capturing new biometric data from the user 101 at step 212, and furthermore processing the captured biometric data at step 214 into a tokenized representation of the newly captured biometric data, the mobile computing device 104 can determine whether a match exists between the stored tokenized biometric representation and the newly generated tokenized biometric representation. If a match exists between the stored tokenized biometric representation and the newly generated tokenized biometric representation, the mobile computing device 104 can transmit an indication of the match (or non-match) to the monitoring party 107. Thus, tokenized representations of newly captured biometrics can be compared to other tokenized biometrics as stored on the mobile computing deice 104, or to tokenized biometrics stored on the band 102 and transmitted to the mobile computing device 104.

Aspects of the captured biometric processing and biometric authentication are generally performed in accordance with the systems and methods described in the patents and/or patent applications incorporated by reference herein.

Moreover, in some examples, the steps 210-216 can be optional steps, or the steps 210-216 may only be performed based on specific system configurations. For example, a verification request can be satisfied if the user's mobile computing device 104 is authenticated with the monitoring party 107, if the tamper loop 114 in a user's tamper-resistant band 102 is read as "untampered" via the user's mobile computing device 104, and if the geographic location data corresponding to the user's mobile computing device 104 is generally permitted under the system configurations.

At step 218, the mobile computing device 104 can transmit the band data and/or the captured biometric data (in a secure and tokenized format) to the monitoring party 107. In some examples, the mobile computing device 104 transmits the band data and an indication of a tokenized biometric match (or non-match), as discussed above in connection with step 216, to the monitoring party 107. The transmission at step 218 can be in reply to the verification request initially transmitted at step 202. In response to receiving the band data and/or the biometric data, the monitoring party 107 can authenticate the band data and/or the captured biometric data. The authentication and/or processing performed at step 220 can resemble the processing performed at step 216. In general, at step 220, the monitoring party 107 determines whether the band data and/or any additional data (such as captured biometric data) matches the data which the monitoring party 107 has stored in connection with the user 101, his/her mobile computing device, his/her tamper-resistant band 102, etc. In some examples, this processing can be performed at the mobile computing device 104 via step 216, or the processing can be performed at the monitoring party 107 (via step 220). In certain examples, the processing and authentication can be performed at both steps 216 and 220.

At step 222, the monitoring party can indicate the user as being verified. In one example, the monitoring party 107 can indicate the user 101 as being verified, in connection with the verification request from step 202, if the user 101 generally satisfied the compliance requirements or standards for the verification request. In addition to determining whether the band data and/or any addition data (such as captured biometric data) matches the data which the monitoring party 107 has stored in connection with the user 101, his/her mobile computing device, his/her tamper-resistant band 102, etc., the monitoring party 107 can determine a delta in time between when the verification request is transmitted and when the request is completed (for example, when band data is received by the monitoring party 107). The monitoring party 107 can also be configured to monitor metadata corresponding to the received band data, such as IP addresses or server addresses present in received transmission packets/packages. In this way, the system can provide a robust, yet flexible and configurable, solution for ATD systems and the like.

Figure 3:
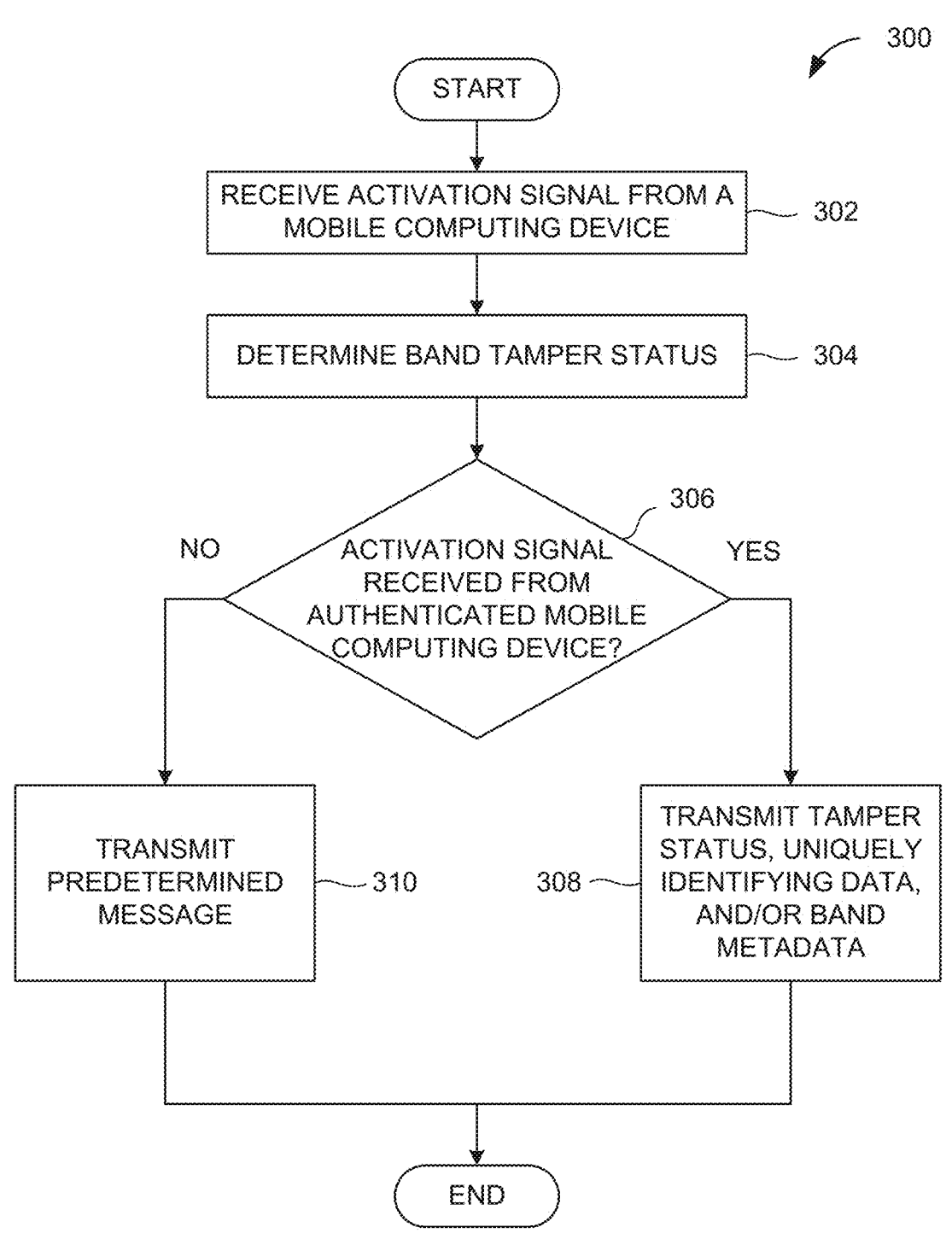
FIG. 3 is a flowchart illustrating a band data transmission process, in accordance with the disclosed technology.

FIG. 3 is a flowchart illustrating a band data transmission process 300, in accordance with the disclosed technology. As discussed throughout the present disclosure, a communication device 103 embedded within the tamper-resistant band 102 can transmit band data to mobile computing devices (such as the mobile computing device 104). The band data can include uniquely identifying information corresponding to the band and/or to the user 101 wearing the band. The uniquely identifying information can be processed for authenticating a user's identity and verifying a user's location (and overall compliance with ATD systems, as discussed herein).

The process 300 can begin at step 302, where the tamper-resistant band 102 receives an activation signal from a mobile computing device. For purposes of the discussion of the process 300, the mobile computing device will be referred to as the mobile computing device 104 corresponding to the user 101; however, it should be understood that any appropriate mobile computing device can provide the activation signal at step 302. In general, any device equipped with NFC technology and capabilities (and in some cases RFID technology) can generate and emit or transmit the activation signal. The activation signal includes an electromagnetic signal from which the communication device 103 within the tamper-resistant band 102 can derive power. Receiving the activation signal at step 302 can also include receiving data corresponding to the verification request and/or corresponding to the mobile computing device from which the activation signal was received.

At step 304, and in response to deriving power from the mobile computing device 104, the communication device 103 can determine the tamper status. As is discussed throughout the present disclosure, the tamper status is a binary number or representation detected within and encoded on the communication device 103, which generally indicates whether the user 101 wearing a particular tamper-resistant band 102 has attempted to forcibly remove, modify, swap, destroy, etc., the band 102. The communication device 103 can determine that a tamper loop 114 is broken, or otherwise tampered with, based on a resistance measured at a pin within the communication device 103, where the pin is operatively connected to the tamper loop 114. The resistance can be measured in response to the communication device 103 receiving power. A resistance measured above 1 MOhm can correspond to an open, or tampered, circuit, while a resistance measured below 50 Ohm can correspond to a closed, or untampered circuit. Detecting an open circuit can result in the communication device 103 registering, or encoding, a "0" tamper status in the memory, while detecting a closed circuit can result in the tamper status remaining as an initially encoded "1" (corresponding to an untampered status). A change in tamper status from "1" to "0" can be an irreversible change, for example, even if the broken circuit is repaired. In some examples, communication device can represent the tamper status as being "invalid" if the tamper status functionality is disabled or not yet configured. In response to receiving power from another device, the communication device 103 can store or represent the "tampered," "untampered," or "invalid" tamper status as hexadecimal representations of "O," "C," and "I," respectively.

At step 306, the system determines whether the activation signal received at step 302 was received from an authenticated mobile computing device. A mobile computing device can be identified as authenticated if, for example, the mobile computing device includes information stored thereon that confirms whether the mobile computing device includes a mobile application that is registered with the monitoring party 107. Furthermore, the mobile computing device can be identified as authenticated if the mobile computing device includes one or more encryption keys for accessing permissioned files within the communication device 103. In some examples, the encryption keys can be assigned to the mobile computing device 104, in connection with the communication device 103, in response to registering the mobile computing device 104 and mobile application with the monitoring party. In certain examples, the encryption keys can be customer-defined (or user-defined) encryption keys. However, the monitoring party 107 can also define and/or control the encryption keys. For example, the monitoring party 107 can define and control the encryption keys, while also allowing for user-specific unique keys.

Determining whether the activation signal was received from an authenticated mobile computing device includes establishing a communication session over a wireless connection (such as the wireless connection 115) established between the mobile computing device 104 and the communication device 103. The communication device 103 within the band 102 can be configured to perform encrypted communications in accordance with three-pass protocols. As will be understood by one of ordinary skill in the art, three-pass communication protocols allow for securely sending messages between parties without requiring for the message's encryption keys to be exchanged or distributed. The communication device 103 can include encryption keys encoded thereon (for example, in a CC file, an NDEF file, another secure file, etc.). In some examples, the communication device 103 memory includes version numbers corresponding to encryption keys. Accordingly, the communication device 103 can transmit, to the mobile computing device, a message including one or more encryption key version numbers (or other encryption key information). If the mobile computing device 104 responds with the appropriate encryption keys which match the transmitted encryption key version numbers, one or more secure, protected, or otherwise permissioned files within the band's embedded communication device 103 can be accessed (as the mobile computing device is identified as authenticated). The communication device 103 can further be configured to include a band tap or read counter for preventing replay attacks.

If, at step 306, the mobile computing device 104 is identified as authenticated, the process 300 proceeds to step 308. At step 308, the communication device 103 can transmit sensitive band data to the mobile computing device given the mobile computing device 104 was determined to be authenticated. The communication device 103 can transmit band data including a tamper status (as detected at step 304) and uniquely identifying data/information such as a band Universally Unique Identifier (UUID), a Globally Unique Identifier (GUID), a band tap or read count, encrypted personally identifiable data such as name, address, social security number, healthcare data such as allergies, blood type, prescribed medications, etc. At step 308, the communication device 103 can also transmit band data including biometric data, such as a tokenized biometric representation (IT2 token), or another appropriate user biometric.

At step 306, if the mobile computing device 104 is not identified as being authenticated, the process 300 proceeds to step 310. At step 310, the communication device 103 can transmit a predetermined message and/or generally insensitive information. In one example, at step 310, the communication device 103 transmits a uniform resource locator (URL) to the mobile computing device. The URL can be transmitted with, or without, the tamper status as determined at step 304. In response to receiving the band data transmission at the mobile computing device 104, processing the URL can cause the mobile computing to launch an internet browser (or another secure portal) and to navigate to the URL. The URL can correspond to a verification portal or interface provided by the monitoring party 107, through which the user 101 can provide authenticating and verifying information such as pictures, videos, voice recordings, etc., or other biometrics. The user 101 can also provide knowledge-based information such as a multi-digit pin, code, or a password to further verify his/her identity. This authenticating and verifying information can be monitored and verified in real-time by the monitoring party computing system 108 and/or by a monitoring party agent 110, or the information can be stored for subsequent processing and verification. In this way, a user need not use his/her personal mobile computing device for responding to verification requests. Further, via step 306, the user 101 can perform a verification "check-in" without receiving a verification request or prompt.

Figure 4:
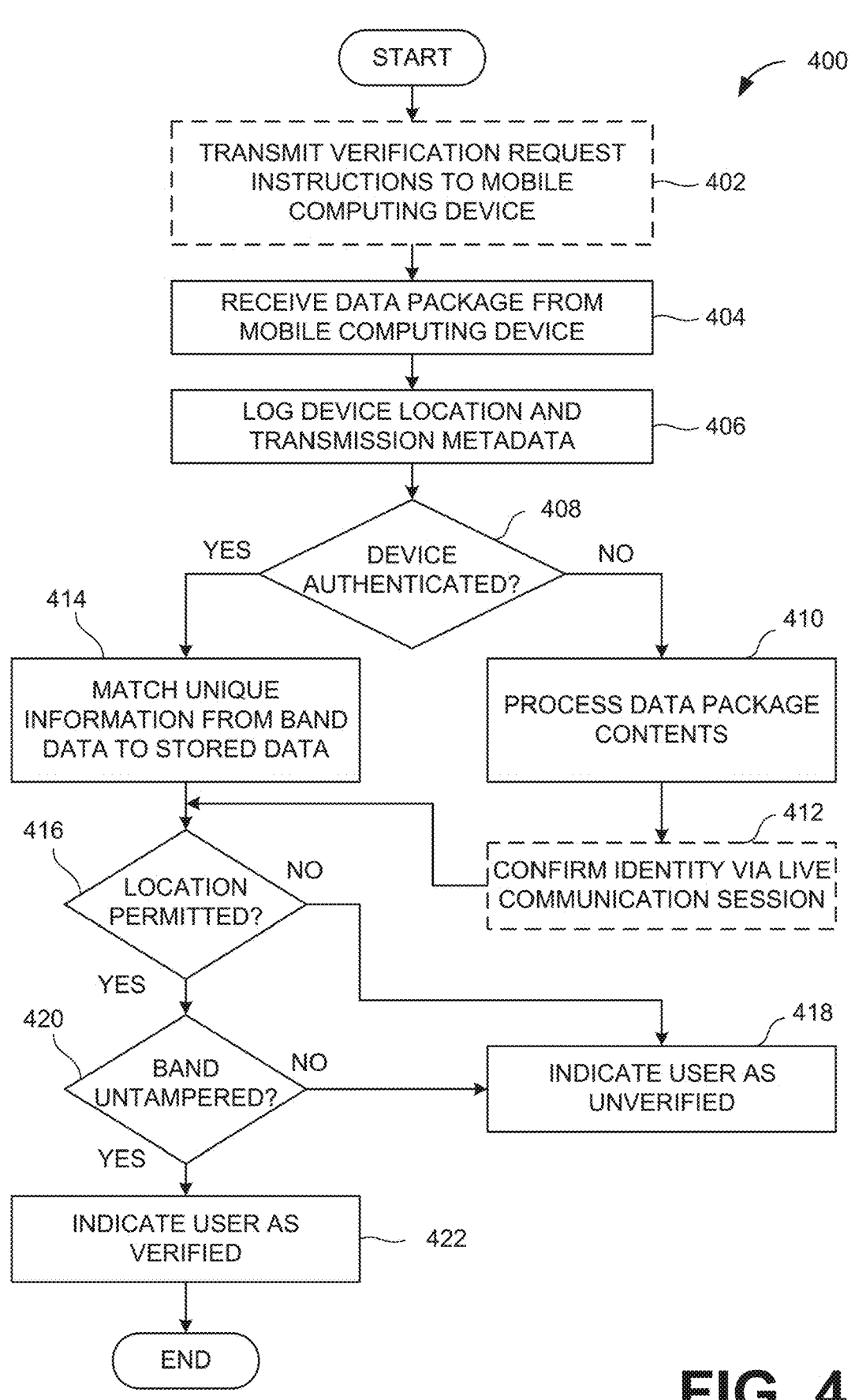
FIG. 4 is a flowchart of an example user authentication and verification process, in accordance with the disclosed technology.

FIG. 4 is a flowchart of a user authentication and verification process 400, in accordance with the disclosed technology. The user authentication and verification process 400 generally illustrates the processing steps by which the monitoring party 107 verifies user compliance with ATD system conditions, tasks, and requests.

The process 400 can begin at step 402, wherein the monitoring party 107 transmits verification request instructions to the mobile computing device 104. The step 402 is shown as including dashed lines to indicate that the step 402 can be an optional step. As discussed throughout the present disclosure, system users need not receive a verification request from the monitoring party 107 for performing a "check-in." In general, and regardless of whether using his/her own mobile computing device 104 or another device, a user 101 can perform a verification "check-in" at any point in time.

At step 404, the monitoring party 107 can receive a data package from the mobile computing device 104. The data package can include band data received from the tamper-resistant band 102 in response to the user 101 scanning the band 102 with the mobile computing device 104. The data package can include additional data, such as biometric data captured via the mobile computing device in connection with the verification request. The data package can further include geographic location data (such as device GPS data) in connection with a timestamp (such as a UTC timestamp) corresponding to one or more verification request events (e.g., transmitting the request, receiving band data, transmitting band data, etc.). The data package can also include metadata such as an IP address associated with the mobile computing device's transmission, one or more server addresses through which the transmission was routed, etc.

At step 406, the monitoring device 107 can log the received device geographic location data and/or metadata. The monitoring party 107 can log the geographic location data and metadata in the database 109, or in another appropriate memory resource. As will be discussed below, the monitoring party 107 can determine whether a user 101 has generally complied with his/her verification request based on information such the mobile computing device's geolocation data and metadata.

At step 408, the monitoring party 107 determines whether the data package received at step 404 was received from an authenticated device. As discussed above in connection with step 306 of the process 300 from FIG. 3, determining whether a mobile computing device 104 is authenticated can include verifying that the mobile computing device 104 is registered with the monitoring party 107, includes valid encryption keys or key version numbers, etc. Further, at step 408, determining whether a data package was received from an authenticated mobile computing device can include parsing the data package contents. For example, if the data package includes a URL and/or data corresponding to newly captured biometric data, the mobile computing device may not be an authenticated device (for example, if the user was requested to provide one or more facial scans using the unauthenticated device of another, where the one or more facial scans are transmitted to the monitoring party 107 for authentication).

If, at step 408, the mobile computing device 104 is determined to not be authenticated, the process 400 can proceed to step 410 where the monitoring party 107 processes data package contents as received from the mobile computing device 104. Processing the data package contents can include establishing a web-based connection with the mobile computing device 104. The web-based connection can correspond to a particular URL or web address to which the mobile computing device navigated (or otherwise established a web connection with) in response to receiving the URL or web address from the band 102. Processing the data package can include authenticating and/or verifying the data package contents. For example, the data package can include biometric data such as one or more facial scans, contactless palm scans, eye scans, iris scans, fingerprint scans, voice recordings, or the like. The biometric data included in the data package can also be tokenized biometric data. A monitoring party agent 110 can authenticate the biometric data and/or the computing system 108 can compare a tokenized representation of the biometric data to one or more stored tokenized representations corresponding to the reporting user.

At step 412, the monitoring party 107 can furthermore confirm the user's identity via a live communication session. The step 412 is shown as being an optional step. The step 412 may not be performed for all users, and the step 412 may not be performed at all times. The live communication session can generally be conducted over the web-based connection established at step 410. In certain examples, the step 412 can be performed for users that have generally been noncompliant with responding to verification requests. In response to performing the step 412, the process 400 can proceed to the step 416.

Referring back to step 408, if the mobile computing device 104 is determined to be authenticated, the process 400 can proceed to step 414 where the monitoring party 107 matches the uniquely identifying data/information from the band data (included within the data package) to stored data. For example, at step 414, the monitoring party 107 can match a UUID from the band data to a particular UUID stored within the database 109 at the monitoring party 107. By matching the UUID from the band data to a stored UUID, the monitoring party can associate the scanned tamper-resistant band 102, and the mobile computing device 104, with a user and/or user account within the monitoring party database 109 and computing system 108. A user's account or profile within the monitoring party database 109 and computing system 108 can include one or more verification compliance conditions, such as permitted geographic locations and/or permitted and restricted geofences.

At step 416, the monitoring party 107 can determine whether the mobile computing device location, as logged at step 406, is a permitted location. The system can configure permitted and/or locations for each user. In certain examples, a user's account or profile within the monitoring system can be configured with no geographic restrictions (for example, as a reward for compliance), or a user's account can include one or more geographic restrictions. Geographic restrictions can include inclusionary restrictions (such as an inclusionary geofence around a user's home, where the user is supposed to remain within) as well as exclusionary restrictions (such as an exclusionary geofence around a restricted area such as the home or workplace of another, where the user is prohibited from entering). If the user's location is determined to be outside his/her permitted location(s), process 400 can proceed to step 418 where the monitoring party 107 can indicate the user as being unverified, or generally noncompliant with his/her ATD system conditions. If the user's location is determined to be a permitted location, the process 400 can proceed to step 420.

At step 420, the monitoring party 107 determines a tamper status in connection with the user's tamper-resistant band 102. The tamper status in connection with the user's tamper-resistant band 102 can be included in band data, which is further included within the data package received at step 404. As discussed throughout the present disclosure, the tamper status, as represented in the band data, can be a binary representation which indicates whether the tamper-resistant band 102 has been forcibly altered, removed, etc. If the tamper status represents a tampered band, the process 400 can proceed again to step 418 where the monitoring party 107 can indicate the user as being unverified. The user can be indicated as being unverified because, given the band's tampered state, the monitoring party 107 cannot verify that the band 102 was not removed from its assigned user, given to another person for completing verification requests on behalf of the user, etc. However, at step 420, if the tamper-resistant band 102 is determined to be in its original untampered state based on the received tamper status, the process 400 can proceed to step 422 where the monitoring party 107 can indicate the user as being verified and generally compliant with the ATD system conditions.

CONCLUSION

The disclosure herein can be carried out wholly or in part by a computing environment, which can include a server computer, or any other system providing computing capability. Alternatively, the computing environment may employ a plurality of computing devices that may be arranged, for example, in one or more server banks or computer banks or other arrangements. Such computing devices can be located in a single installation or may be distributed among many different geographical locations. For example, the computing environment can include a plurality of computing devices that together may include a hosted computing resource, a grid computing resource, and/or any other distributed computing arrangement. In some cases, the computing environment can correspond to an elastic computing resource where the allotted capacity of processing, network, storage, or other computing-related resources may vary over time.

Various applications and/or other functionality may be executed in the computing environment according to various embodiments. Also, various data is stored in a database that is accessible to the computing environment. The database can be representative of a plurality of databases as can be appreciated. The data stored in the database, for example, may be associated with the operation of the various applications and/or functional entities described herein.

The computing environment can communicate with a plurality of computing devices and querying devices (which may include computing devices) via a network. The network includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks.

Aspects, features, and benefits of the systems, methods, processes, formulations, apparatuses, and products discussed herein will become apparent from the information disclosed in the figures and the other applications as incorporated by reference. Variations and modifications to the disclosed systems and methods may be affected without departing from the spirit and scope of the novel concepts of the disclosure.

It will, nevertheless, be understood that no limitation of the scope of the disclosure is intended by the information disclosed in the figures or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the systems and processes to the precise forms disclosed. Many modifications and variations are possible in light of the above teaching.

The embodiments were chosen and described in order to explain the principles of the systems and processes and their practical application so as to enable others skilled in the art to utilize the systems and processes and various embodiments and with various modifications as are suited to the particular use contemplated. Alternative embodiments will become apparent to those skilled in the art to which the present systems and processes pertain without departing from their spirit and scope. Accordingly, the scope of the present systems and processes is defined by the appended claims rather than the foregoing description and the exemplary embodiments described therein.

From the foregoing, it will be understood that various aspects of the processes described herein are software processes that execute on computer systems that form parts of the system. Accordingly, it will be understood that various embodiments of the system described herein are generally implemented as specially configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed systems and processes may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions associated data structures and/or schemas, and program modules represent examples of the program code for executing steps of the methods disclosed herein. The particular sequence of such executable instructions or associated data structures represents examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed systems and processes are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, or in the case of an NFC wrist band or RFID device, by holding it in close proximity or tapping it to an NFC or RFID enabled computer, smartphone or mobile device, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems and processes are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the systems and processes is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems and processes will be readily discernible from the description herein, by those of ordinary skill in the art. Many embodiments and adaptations of the disclosure and claimed systems and processes other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems and processes. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems and processes. In addition, some steps may be carried out simultaneously, contemporaneously, or in synchronization with other steps.

The embodiments were chosen and described in order to explain the principles of the claimed systems and processes and their practical application so as to enable others skilled in the art to utilize the systems and processes and various embodiments and with various modifications as are suited to the particular use contemplated. Alternative embodiments will become apparent to those skilled in the art to which the claimed systems and processes pertain without departing from their spirit and scope. Accordingly, the scope of the claimed systems and processes is defined by the appended claims rather than the foregoing description and the exemplary embodiments described therein.

What is claimed is:

1. A method comprising:
receiving, at a mobile computing device, a verification request from a remote computing system, wherein the verification request comprises instructions for a user to perform one or more verification tasks, and wherein a particular verification task of the one or more verification tasks comprises the user scanning a band securely attached to a body of the user;
displaying, via a screen on the mobile computing device, an indication of the verification request and corresponding instructions for the user to perform the particular verification task, wherein the particular verification task comprises scanning the band with the mobile computing device;
receiving, from a communication device embedded within the band, band data comprising unique identifying information and a band tamper status;
determining a geographic location of the mobile computing device in response to receiving the band data; and
transmitting, from the mobile computing device to the remote computing system, a data package comprising the band data and the geographic location of the mobile computing device for subsequent processing at the remote computing system, wherein an untampered band tamper status and verified unique identifying information confirms a presence of the user at the geographic location.

2. The method of claim 1, wherein the unique identifying information comprises tokenized biometric data corresponding to the user.

3. The method of claim 1, further comprising:
displaying, via the screen on the mobile computing device, the verification request and corresponding instructions for the user to perform a subsequent verification task comprising providing one or more biometric features from the body of the user; and
receiving, via one or more sensors of the mobile computing device, the one or more biometric features from the body of the user.

4. The method of claim 3, wherein the data package transmitted from the mobile computing device to the remote computing system comprises the one or more biometric features from the body of the user.

5. The method of claim 4, wherein:
the unique identifying information comprises tokenized biometric data corresponding to the user; and
performing the subsequent verification task comprises comparing the one or more biometric features from the body of the user and the tokenized biometric data to determine a match.

6. The method of claim 1, wherein the data package further includes a timestamp generated by the mobile computing device in response to receiving the band data.

7. The method of claim 6, wherein the subsequent processing comprises comparing the timestamp, generated by the mobile computing device in response to receiving the band data, to a prior timestamp, generated by the remote computing system in connection with the verification request, to determine a verification request compliance rate.

8. A system comprising:
a processor; and
a memory on which are stored machine-readable instructions that when executed by the processor, cause the processor to:
receive, at a mobile computing device, a verification request from a remote computing system, wherein the verification request comprises instructions for a user to perform one or more verification tasks, and wherein a particular verification task of the one or more verification tasks comprises the user scanning a band securely attached to a body of the user;
display, via a screen on the mobile computing device, an indication of the verification request and corresponding instructions for the user to perform the particular verification task, wherein the particular verification task comprises scanning the band with the mobile computing device;
receive, from a communication device embedded within the band, band data comprising unique identifying information and a band tamper status;
determine a geographic location of the mobile computing device in response to receiving the band data; and
transmit, from the mobile computing device to the remote computing system, a data package comprising the band data and the geographic location of the mobile computing device for subsequent processing at the remote computing system, wherein an untampered band tamper status and verified unique identifying information confirms a presence of the user at the geographic location.

9. The system of claim 8, wherein the uniquely unique identifying information comprises tokenized biometric data corresponding to the user.

10. The system of claim 8, wherein the processor is further caused to:

display, via the screen on the mobile computing device, the verification request and corresponding instructions for the user to perform a subsequent verification task comprising providing one or more biometric features from the body of the user; and receive via one or more sensors of the mobile computing device, the one or more biometric features from the body of the user.

11. The system of claim 10, wherein the data package transmitted from the mobile computing device to the remote computing system comprises the one or more biometric features from the body of the user.

12. The system of claim 11, wherein:

the unique identifying information comprises tokenized biometric data corresponding to the user; and performing the subsequent verification task comprises comparing the one or more biometric features from the body of the user and the tokenized biometric data to determine a match.

13. The system of claim 8, wherein the data package further includes a timestamp generated by the mobile computing device in response to receiving the band data.

14. The system of claim 13, wherein the subsequent processing comprises comparing the timestamp, generated by the mobile computing device in response to receiving the band data, to a prior timestamp, generated by the remote computing system in connection with the verification request, to determine a verification request compliance rate.

15. A non-transitory computer readable medium comprising instructions that, when read by a processor, cause the processor to perform:

receiving, at a mobile computing device, a verification request from a remote computing system, wherein the verification request comprises instructions for a user to perform one or more verification tasks, and wherein a particular verification task of the one or more verification tasks comprises the user scanning a band securely attached to a body of the user;

displaying, via a screen on the mobile computing device, an indication of the verification request and corresponding instructions for the user to perform the particular verification task, wherein the particular verification task comprises scanning the band with the mobile computing device;

receiving, from a communication device embedded within the band, band data comprising unique identifying information and a band tamper status;

determining a geographic location of the mobile computing device in response to receiving the band data; and transmitting, from the mobile computing device to the remote computing system, a data package comprising the band data and the geographic location of the mobile computing device for subsequent processing at the remote computing system, wherein an untampered band tamper status and verified unique identifying information confirms a presence of the user at the geographic location.

16. The non-transitory computer readable medium of claim 15, wherein the unique identifying information comprises tokenized biometric data corresponding to the user.

17. The non-transitory computer readable medium of claim 15, further comprising instructions that, when read by the processor, further cause the processor to perform:

displaying, via the screen on the mobile computing device, the verification request and corresponding instructions for the user to perform a subsequent verification task comprising providing one or more biometric features from the body of the user; and receiving, via one or more sensors of the mobile computing device, the one or more biometric features from the body of the user.

18. The non-transitory computer readable medium of claim 17, wherein the data package transmitted from the mobile computing device to the remote computing system comprises the one or more biometric features from the body of the user.

19. The non-transitory computer readable medium of claim 18, wherein:

the unique identifying information comprises tokenized biometric data corresponding to the user; and performing the subsequent verification task comprises comparing the one or more biometric features from the body of the user and the tokenized biometric data to determine a match.

20. The non-transitory computer readable medium of claim 15, wherein the data package further includes a timestamp generated by the mobile computing device in response to receiving the band data, and wherein the subsequent processing comprises comparing the timestamp, generated by the mobile computing device in response to receiving the band data, to a prior timestamp, generated by the remote computing system in connection with the verification request, to determine a verification request compliance rate.

21. A system comprising:

a mobile computing device; and a wearable band, wherein the wearable band comprises:

a locking mechanism, wherein the locking mechanism is operatively configured to secure the wearable band to a body of a subject; and a communication device comprising a tamper circuit operatively configured to indicate a binary tamper status corresponding to the subject's continuous wearing of the wearable band subsequent to securing the wearable band to the body of the subject via the locking mechanism, and wherein in response to the communication device deriving power from an electromagnetic field generated by the mobile computing device, the communication device is operatively configured to:

transmit, to the mobile computing device, a request for a particular version number corresponding to an encryption key, wherein the encryption key is configured to permit access to a memory of the communication device, and wherein the memory comprises identifying information corresponding to the subject;

receive, from the mobile computing device, the encryption key corresponding to the particular version number; and transmit, to the mobile computing device, the binary tamper status and identifying information corresponding to the subject.

* * * * *